Jan. 5, 1932.   R. R. MAUK   1,839,326
ANCHORING MEANS FOR SHIPPED GOODS
Filed Dec. 5, 1930   3 Sheets-Sheet 1
Fig. 1.
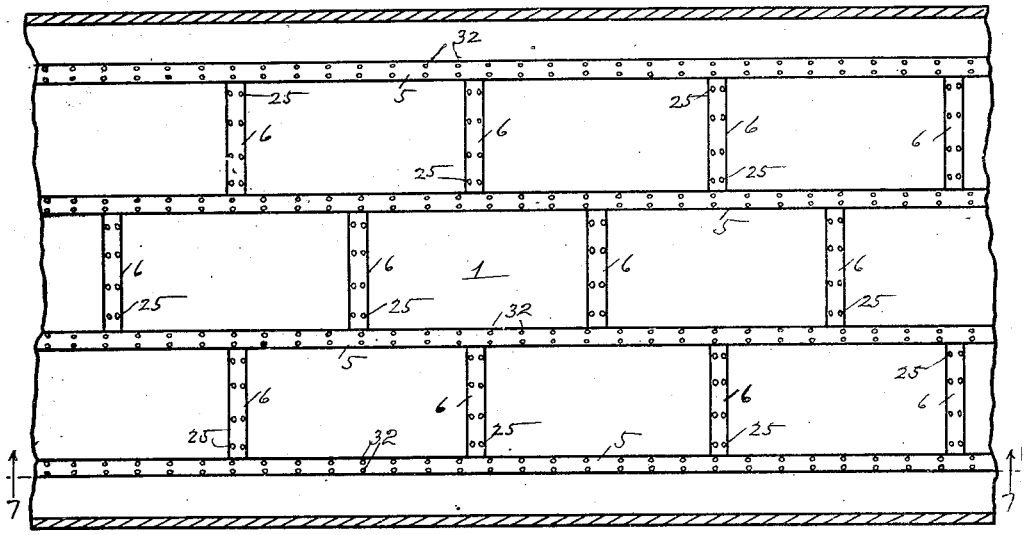
Fig. 7.
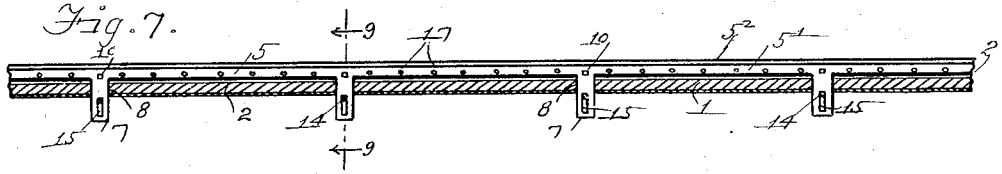
Fig. 8.
Fig. 9.
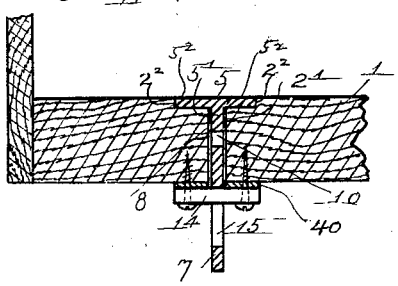
INVENTOR.
Robert R. Mauk
BY Rice and Rice
ATTORNEYS.
Witness Jan. 5, 1932.  R. R. MAUK  1,839,326
ANCHORING MEANS FOR SHIPPED GOODS
Filed Dec. 5, 1930  3 Sheets-Sheet 2
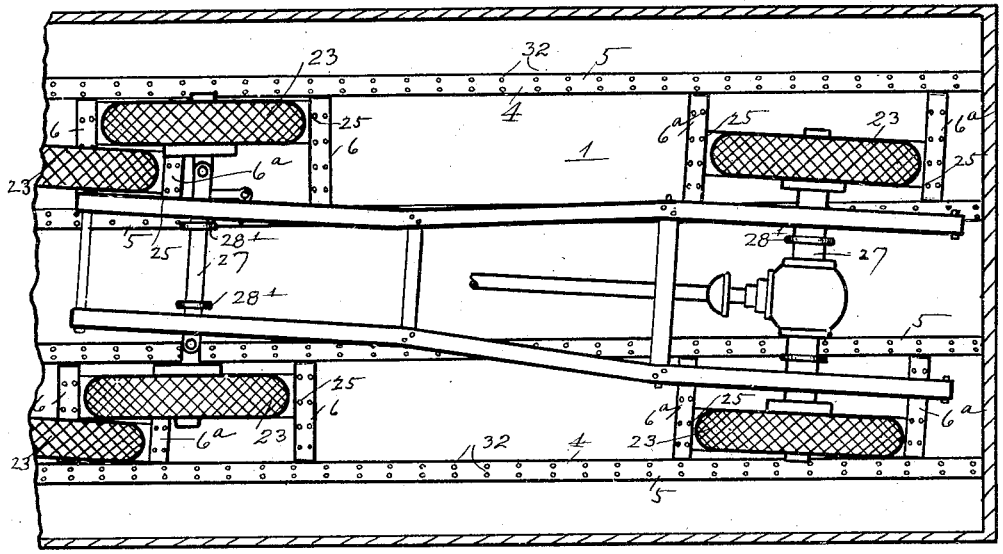
Fig. 2.
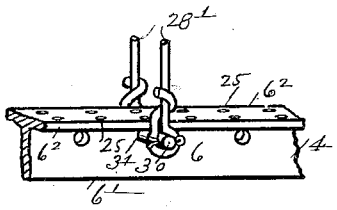
Fig. 12.
Fig. 13.
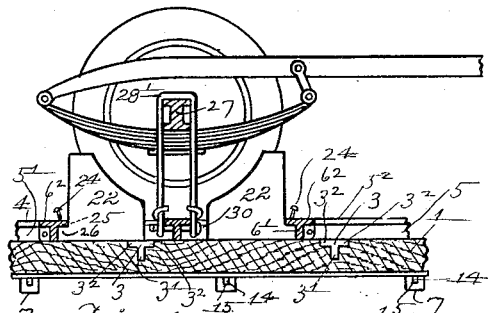
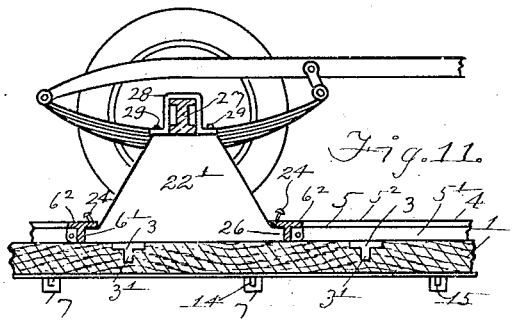
Fig. 10.  Fig. 11.
INVENTOR.
Robert R. Mauk
BY Rice and Rice
ATTORNEYS.
Witness:

Jan. 5, 1932.   R. R. MAUK   1,839,326
ANCHORING MEANS FOR SHIPPED GOODS
Filed Dec. 5, 1930   3 Sheets-Sheet 3
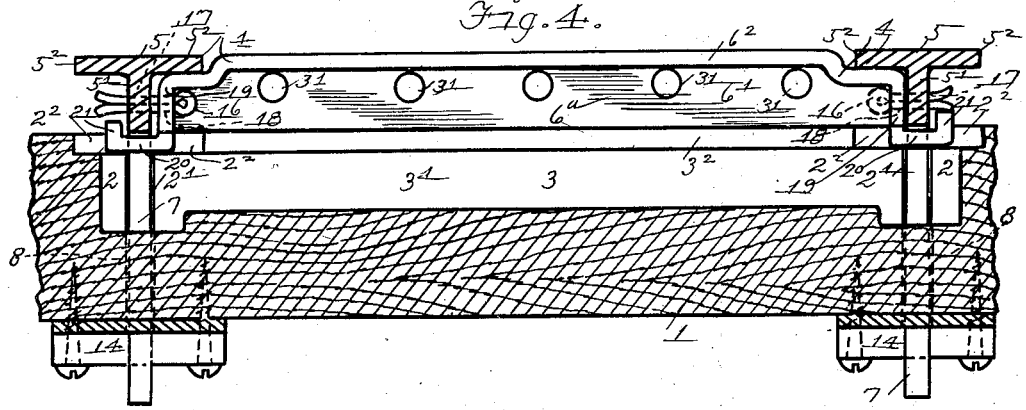
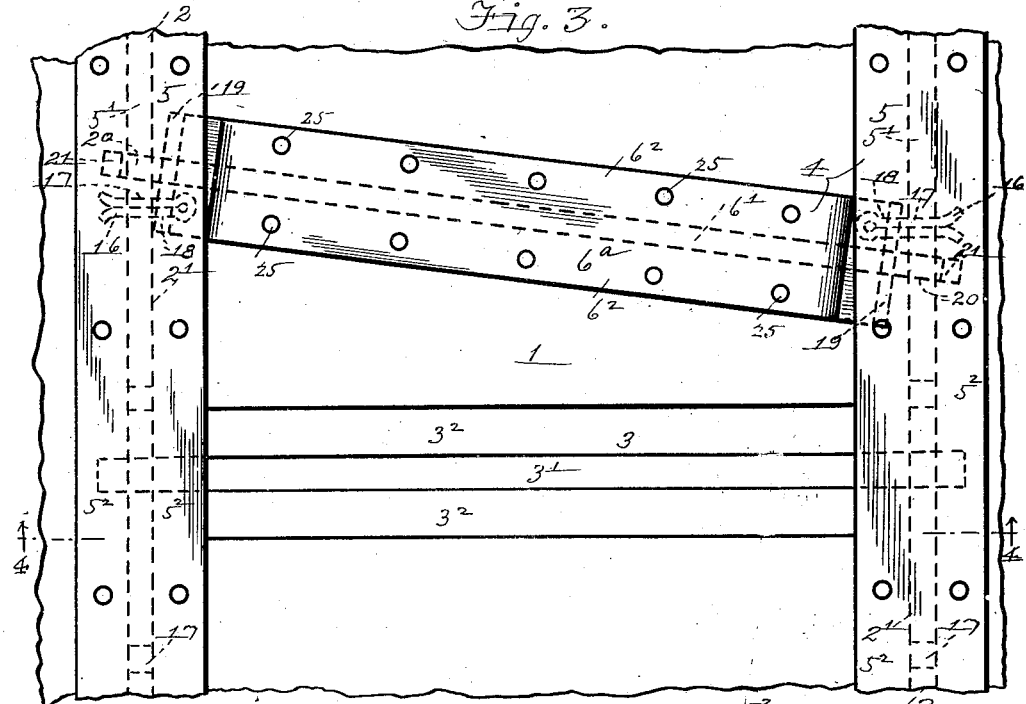
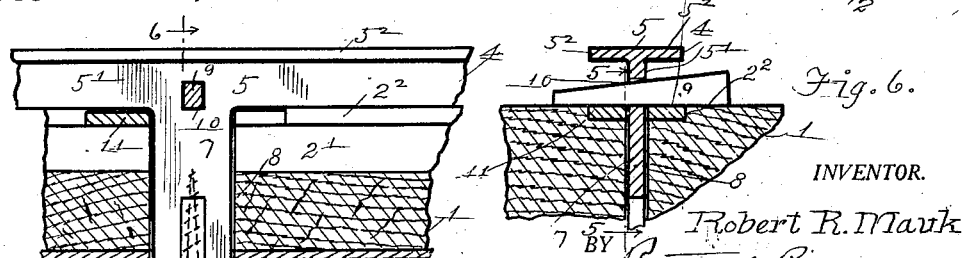
INVENTOR.
Robert R. Mauk
BY Rice and Rice
ATTORNEYS.

Patented Jan. 5, 1932

1,839,326

UNITED STATES PATENT OFFICE

ROBERT R. MAUK, OF GRAND RAPIDS, MICHIGAN

ANCHORING MEANS FOR SHIPPED GOODS

Application filed December 5, 1930. Serial No. 500,182.

The present invention relates to anchoring means for vehicles, such as automobiles, and other goods in freight cars during shipment; and its object is generally, to provide improved means of that character; and more particularly, to provide such means which may be raised into a position of use above the level of the floor of the freight car and lowered to said level when not in use; and further, to provide such means comprising track members and cross members adjustably secured thereto; and further, to provide improved means for releasably securing said members in positions of use; and further, to provide improved means for releasably securing the members in interrelative positions; and further, to provide improved means for releasably securing such a vehicle to said anchoring means.

This and any other and more specific objects hereinafter appearing are attained by, and the invention finds preferable embodiment in, the illustrative structure particularly described in the body of this specification and illustrated by the accompanying drawings, in which:

Figure 1 is a plan view of the floor of a freight car and of the frame of the anchoring means installed therein;

Figure 2 is a plan view of the same, said frame being raised into usable position, its members in adjusted position, and an automobile anchored thereon;

Figure 3 is a plan view (enlarged) of a portion of the same;

Figure 4 is a sectional view thereof taken on a vertical plane corresponding to line 4—4 of Figure 3;

Figure 5 is a sectional view of portions of the same taken on a vertical plane corresponding to line 5—5 of Figure 6;

Figure 6 is a sectional view of said portions taken on a vertical plane corresponding to line 6—6 of Figure 5;

Figure 7 is a side view of said frame and a sectional view of the floor of the freight car taken on a vertical plane corresponding to line 7—7 of Figure 1;

Figure 8 is a like view of the same, but showing said frame in its elevated position of use;

Figure 9 is a sectional view of the same taken on a vertical plane corresponding to line 9—9 of Figure 7 and showing said frame in lowered position;

Figure 10 is an elevational view of a portion of the same partially sectioned with vehicle wheel-holding blocks mounted thereon and a portion of an automobile anchored thereto;

Figure 11 is a view similar to Figure 10 but showing a modified construction of a wheel-holding block;

Figure 12 is a detail fragmentary view of one of the cross members of said frame and an anchoring rod secured thereto; and Figure 13 is a view of a plate whereon said raised frame is supported.

In these drawings, the floor 1 of a freight car is shown having upwardly-open horizontal channels 2 extending in the car's longitudinal direction and cross channels 3 extending between the same. These channels respectively have narrow and deep middle portions $2^1$, $3^1$ and at their mouths wider and shallower lateral portions $2^2$, $3^2$. The frame designated generally 4 of the anchoring means comprises track members 5 and cross members 6 adjustably secured thereto, and having respectively middle or web portions $5^1$, $6^1$, and lateral or flange portions $5^2$, $6^2$ seating in the channels when the frame is not in use, the upper surface of said members being then desirably level with the floor's surface.

In the illustrated position of use, said frame 4 has been raised in the channels, the downward extensions 7 of the track members 5 sliding in vertical guides or bearings 8 in the car floor, said members 5 being held in such raised position by suitable means as the wedge keys 9 driven through openings 10 in the track members' extensions and resting on plates 11 which have spaced arms 12 as seen in Figure 13, these plates resting in the lateral portions $2^2$ of the channels 2 and their arms straddling the extensions 7.

As the wedge keys are driven inwardly they cause the track members to press upwardly on the cross bars 14 which pass through openings 15 in the extensions 7, and thus wedgingly secure said track members in fixed raised position. These cross bars 14 are secured as by screws on the under side of the floor 1, as seen in Figure 9, a long bar 40 which extends in the car's longitudinal direction being interposed between the floor and bar 14. A desired number of the cross members 6 of the frame are raised from their receiving channels 3 and positioned at points along the track members, to which they are secured by suitable means as the cotter pins 16 inserted through holes 17 in the track members' middle portions 5¹ and holes 18 in the end portions of the cross members, such end portions extending downwardly at 19, horizontally-outwardly at 20 and then upwardly at 21, thus underlying the track members.

These cross members 6 may be inclined, as are the cross members 6ª in Figures 2, 3 and 4, so that automobiles may be more closely positioned as indicated in Figure 2, in which case the cotter pins at the ends of these cross members may be inserted through holes 17 on the opposite sides respectively of said member's middle portion 6¹. The automobile is secured to the frame 4 of the anchoring means by suitable devices, as by a pair of blocks 22 engaging the opposite sides of the automobile wheels 23 as shown in Figure 10, these blocks being held in position on the track members as by nails 24 driven through holes 25 in the cross-members' laterally extending portions or flanges 6² and into portions 26 of the blocks underlying said flanges.

In the modified construction seen in Figure 11, such blocks 22¹ are provided near the ends of the automobile's axles 27 on which said axles rest to hold the wheels clear of the car floor. An anchoring stirrup 28 extending over the axle and secured at its ends as by screw bolts 29 to the block 22¹ serves to securely hold the automobile against movement or an anchoring rod 28¹ may be provided extending over the axle, its ends being twisted around a pin 30 extending through a hole 31 in the cross member 6 as shown in Figures 10 and 12.

It will be understood that such a frame 4 may be installed in the floor of any freight car, whether of the enclosed box-car type, or the platform or gondola type; and further, that such a frame may be positioned in the vertical walls as well as in the floor of the car for various uses; and that other goods, boxes, machinery, etc., as well as automobiles, may be anchored to such a frame as by cords or wires passed through the holes 25, 31, 32 in the frame or around its members 5, 6. It will be seen that when the frame is lowered into the channels, it offers no obstruction or impediment to the use of the freight car for any other purpose.

The invention being intended to be pointed out in the claims, is not to be limited to or by details of construction of the particular embodiment thereof illustrated by the drawings or hereinbefore described.

I claim:

1. In a freight car: a floor having open channels; freight-anchoring devices including a frame seating in the channels and adapted to be raised in a guided vertical direction to use position, and means for securing the freight to said frame.

2. In a freight car: a floor having open channels extending longitudinally and transversely thereof respectively; freight-anchoring devices including a frame comprising members seating in the channels respectively and adapted to be raised to use position, and means for securing the freight to said frame.

3. In a freight car: a floor having open channels extending longitudinally and transversely thereof respectively; freight-anchoring devices including a frame comprising track members and cross members seating in said channels respectively and adapted to be raised to use position, means for securing the cross members to the raised track members in adjusted positions, and means for securing the freight to said frame.

4. In a freight car: a floor having open channels with shallow lateral portions; freight-anchoring devices including a frame seating in the channels and having flange portions seating in said lateral portions and adapted to be raised to use position, means for securing the frame in raised position, and means for securing the freight to the frame.

5. In a freight car: a floor having open channels and vertical openings; freight-anchoring devices including a frame seating in the channels and adapted to be raised to use position and having portions extending downwardly in said openings, means for securing the freight to said frame; means for securing the frame in raised position.

6. In a freight car: a floor having open channels and vertical openings; freight-anchoring devices including a frame seating in the channels and adapted to be raised to a stopped use position and having portions extending downwardly in said openings, means for securing the freight to said frame; means for securing the frame in raised position comprising keys engaging said downwardly extending portions.

7. In a freight car: a floor having open channels and vertical openings; freight-anchoring devices including a frame seating in the channels and adapted to be raised to a stopped use position and having portions extending downwardly in said openings, means for securing the freight to said frame; means for securing the frame in raised position comprising keys engaging said downwardly extending portions and removable plates straddling said portions and resting on the floor and supporting the keys.

8. In a freight car: a floor having open channels; freight-anchoring devices including a frame having holes therethrough and seating in the channels and adapted to be raised to use position, and means passing through said holes for securing the freight to the frame.

9. In a freight car: a floor having open channels; freight-anchoring devices including a frame comprising track members seating in the channels and adapted to be raised to use position and including also separate cross members, means for securing the cross members to the track members, and means for securing the freight to said frame.

10. In a freight car: a floor having open channels; freight-anchoring devices including a frame comprising track members seating in the channels and adapted to be raised to use position and including also separate cross members underlying at their ends the track members, means for securing the cross members to the track members, and means for securing the freight to said frame.

11. In a freight car: a floor having open channels; freight-anchoring devices including a frame comprising track members seating in the channels and adapted to be raised to use position and including also separate cross members, means for securing the cross members to the track members including cotter pins extending through holes in the track members and cross members, and means for securing the freight to said frame.

12. In a freight car: a floor having open channels; vehicle-anchoring devices including a frame having holes therethrough, and blocks holdingly engaging the wheels of the vehicle and secured in position by means extending through said holes and into the blocks.

13. In a freight car: a floor having open channels; vehicle-anchoring devices including a frame having holes therethrough, and blocks supporting the axle of the vehicle and secured in position by means extending through said holes and into the blocks.

14. In a freight car: a floor having open channels; vehicle-anchoring devices including a frame seating in the channels and adapted to be raised to use position, and vehicle-anchoring rods passing over the vehicle's axle and engaging the frame raised to use position below the upper surface thereof.

In testimony whereof I have hereunto set my hand at Grand Rapids, Michigan, this 2nd day of December, 1930.

ROBERT R. MAUK.